(12) United States Patent
Hamabashiri et al.

(10) Patent No.: US 10,049,309 B2
(45) Date of Patent: Aug. 14, 2018

(54) CHARACTER RECOGNITION DEVICE, CHARACTER RECOGNITION METHOD AND PROGRAM

(71) Applicant: OMRON Corporation, Kyoto (JP)

(72) Inventors: Hideto Hamabashiri, Moriyama (JP); Tomoyoshi Aizawa, Kyoto (JP); Tadashi Hyuga, Hirakata (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/327,381

(22) PCT Filed: Oct. 30, 2015

(86) PCT No.: PCT/JP2015/080821
§ 371 (c)(1),
(2) Date: Jan. 19, 2017

(87) PCT Pub. No.: WO2016/068325
PCT Pub. Date: May 6, 2016

(65) Prior Publication Data
US 2017/0277982 A1    Sep. 28, 2017

(30) Foreign Application Priority Data

Oct. 31, 2014  (JP) ................................. 2014-222944

(51) Int. Cl.
*G06K 9/48*  (2006.01)
*G06K 9/68*  (2006.01)
*G06F 17/30*  (2006.01)

(52) U.S. Cl.
CPC ......... *G06K 9/68* (2013.01); *G06F 17/30244* (2013.01); *G06K 2209/01* (2013.01); *G06K 2209/15* (2013.01)

(58) Field of Classification Search
CPC ........ G06K 9/68; G06K 9/6255; G06K 9/036; G06K 9/32266; G06K 2209/15; G06K 2209/01; G06F 17/30244
See application file for complete search history.

(56) References Cited

U.S. PATENT DOCUMENTS

| 5,872,530 | A | * | 2/1999 | Domyo | ............... | H03M 7/3088 |
| | | | | | | 341/106 |
| 9,875,532 | B2 | * | 1/2018 | Shibata | ................. | G06T 7/0002 |

(Continued)

FOREIGN PATENT DOCUMENTS

| JP | H05-108886 | 4/1993 |
| JP | H08241378 | 9/1996 |

(Continued)

OTHER PUBLICATIONS

Sawaki et al., "Recognition of Characters in Bookshelf Images using Automatic Dictionary Selection based on Estimated Degradation," Journal of the Institute of Image Information and Television Engineers, Jun. 2000, pp. 881-886, with partial English translation thereof.

(Continued)

*Primary Examiner* — Ali Bayat
(74) *Attorney, Agent, or Firm* — JCIPRNET

(57) ABSTRACT

A character recognition device comprising: a storage means storing a plurality of dictionary databases corresponding to each of a plurality of degradation levels, said databases being generated from images wherein an original character image has been degraded using a plurality of different degradation levels; an image input means that receives input of images; an extraction means that extracts character images from said images; a usage order determination means that determines an usage order for dictionary databases on the basis of degradation degrees for extracted character images; and a character recognition means that (Continued)

uses dictionary databases in accordance with said usage order, recognizes characters included in the extracted character image and, if recognition results for the character recognition fulfill prescribed conditions, outputs the recognition results without performing recognition using the dictionary database next in said usage order. As a result, accurate and fast recognition of degraded character images can be performed.

9 Claims, 8 Drawing Sheets

(56) References Cited

U.S. PATENT DOCUMENTS

| | | | |
|---|---|---|---|
| 2006/0056696 A1* | 3/2006 | Jun | G06K 9/6255 382/185 |
| 2012/0321157 A1 | 12/2012 | Yang et al. | |
| 2014/0328518 A1* | 11/2014 | Kozitsky | G06K 9/2018 382/105 |

FOREIGN PATENT DOCUMENTS

| | | |
|---|---|---|
| JP | H11-175662 | 7/1999 |
| JP | 2005-149395 | 6/2005 |
| JP | 2006-059351 | 3/2006 |
| JP | 2009-037621 | 2/2009 |
| WO | 2012173205 | 12/2012 |

OTHER PUBLICATIONS

"Office Action of Japan Counterpart Application," dated Jan. 16, 2018, with English translation thereof, p. 1-p. 7.

Sawaki et al., "Recognition of Characters in Bookshelf Images using Automatic Dictionary Selection based on Estimated Degradation", The Journal of the Institute of Image Information and Television Engineers, Jun. 20, 2000, pp. 881-886.

Minako Sawaki et al.,"Character recognition in bookshelf images by automatic template selection",Proceedings, Fourteenth International Conference on Pattern Recognition, vol. 2, Aug. 16, 1998,pp. 1117-1120.

J.L.Blue et al.,"Evaluation of pattern classifiers for fingerprint and OCR applications",Pattern Recognition,vol. 27, Issue 4, Apr. 1994, pp. 485-501.

Jenn-Kwei Tyan et al.,"A character segmentation algorithm for recognition of vehicle license plate",Proceedings SPIE, Mobile Robots XIV, vol. 3838, Sep. 1999, pp. 12-21.

"Search Report of European Counterpart Application," dated May 25, 2018, p. 1-p. 10.

* cited by examiner

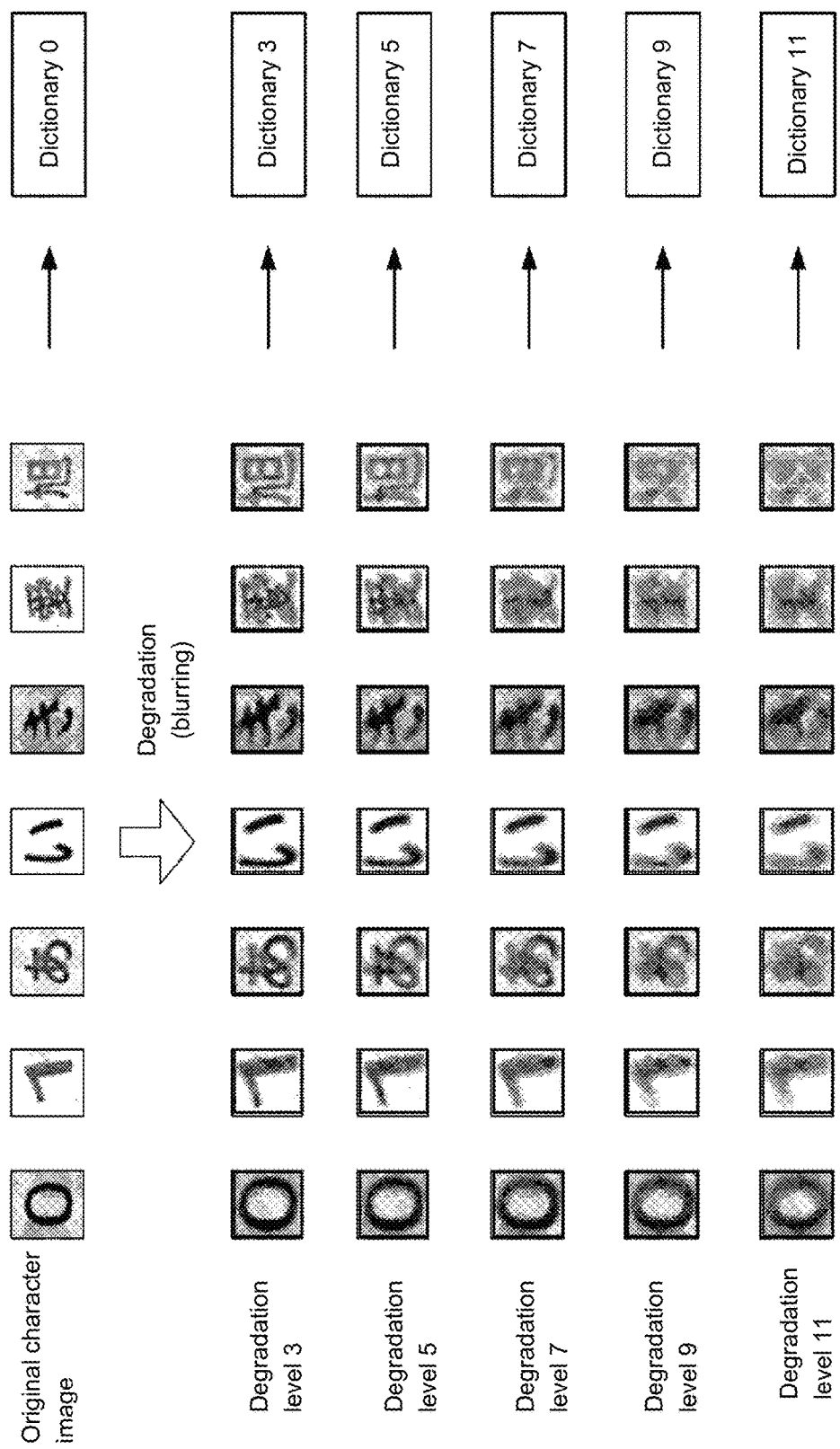

Degradation degree=$R_0$-max(w, h)

| Degradation degree r | Degradation level |
|---|---|
| r < 10 | 0 |
| 10 ≦ r < 20 | 3 |
| 20 ≦ r < 25 | 5 |
| 25 ≦ r < 30 | 7 |
| 30 ≦ r < 35 | 9 |
| 35 ≦ r < 40 | 11 |

FIG. 7

CHARACTER RECOGNITION DEVICE, CHARACTER RECOGNITION METHOD AND PROGRAM

CROSS-REFERENCE TO RELATED APPLICATIONS

This application is a 371 of international application of PCT application serial no. PCT/JP2015/080821, filed on Oct. 30, 2015, which claims the priority benefit of Japan application no. 2014-222944, filed on Oct. 31, 2014. The entirety of each of the above-mentioned patent applications is hereby incorporated by reference herein and made a part of this specification.

BACKGROUND OF THE INVENTION

1. Field of the Invention

The present invention relates to a character recognition processing, in particular, to a character recognition processing capable of rapidly recognizing degraded character images.

2. Description of Related Art

As one of the issues in Optical Character Recognition (OCR) in which written or printed characters are optically read and recognized, sometimes it is necessary to recognize degraded character images accurately. In character recognition processing, if a size of a character image of a recognition image is sufficiently large or in an ideal state without blur or half-dry stroke, damage, noise and the like, the recognition precision is high. However, if the size of the character image is small or in the presence of blur or half-dry stroke, damage and noise, the character recognition precision will decrease. For example, if the size of the character image is small, blur may occur if the character size is enlarged through standardization processing, and thus the precision of the character recognition using a dictionary made according to ideal character images will decrease. In a situation where the character image of such a recognition object deviates from the ideal state, the character image may be degraded.

For example, as an application of OCR, a number plate recognition system is known, which uses a camera to shoot number plates hung on vehicles driving on the road, and recognizes described characters. In the past, the mainstream approach was arranging a camera above the road for each lane; however, in recent years, in consideration of limitations of device conditions or costs, a practice of fixedly arranging a camera on a lamp-post erected on a road side emerges. When the manner of arranging the camera on a road side is used on a multi-lane road, according to different distances from the lanes to the camera, a size of a number plate on a lane close to the camera is different from a size of a number plate on a lane away from the camera. A character image in a number plate of a distant lane becomes small, and through standardization processing, the character image may be degraded.

As a recognition method for degraded character images, Patent Document 1 may be listed. Patent Document 1 discloses: pre-making various dictionaries of degradation levels, and based on similarity between a character image of a recognition object and a test sample with a same degradation level, determining a degradation level of a dictionary to be used.

DOCUMENTS OF THE PRIOR ART

Patent Document 1: Japanese Patent Gazette No. 2006-59351

Patent Document 2: Description of International Publication No. 2012/173205

SUMMARY OF THE INVENTION

Problem to be Solved in the Invention

However, the method of Patent Document 1 has the following problems. In the method, a dictionary to be used is determined based on a test sample. Therefore, like recognition of character images in vehicle number plates in outdoor environments, a size or blur degree of an image of a recognition object may deviate, it is difficult to determine a dictionary corresponding to a case where degradation levels of dictionaries with each image or each character being optimal, and the determined dictionary sometimes is not the optimal dictionary.

A method of solving the problem considers recognizing various dictionaries of degradation levels one by one. However, if the number of times an input character image is compared increases (if the number of characters included in one dictionary is set as k and the number of degraded dictionaries is n, it is necessary to make k×n comparisons), the processing time may increase.

The present invention is accomplished in view of the actual situation, which provides a technology capable of accurate and fast recognition of degraded character images.

Technical Means of Solving the Problems

In order to achieve the objective, the present invention has the following structure.

A first aspect of the present invention is a character recognition device, including: a storage means storing a plurality of dictionary databases corresponding to each of a plurality of degradation levels, said databases being generated from images wherein an original character image has been degraded using a plurality of different degradation levels; an image input means that receives input of images; an extraction means that extracts character images from said images; a usage order determination means that determines an usage order for the plurality of dictionary databases on the basis of degradation degrees for extracted character images; and a character recognition means that uses dictionary databases in accordance with said usage order, recognizes characters included in the extracted character image and, if the recognition results for the character recognition do not fulfil prescribed conditions, performs character recognition using the dictionary database next in usage order, if the recognition results for the character recognition fulfil the prescribed conditions, outputs the recognition results without performing recognition using the dictionary database next in usage order.

According to the structure, as a plurality of dictionary databases of degradation levels are stored, degraded character images can be recognized accurately. Then, it is unnecessary to perform recognition using all the dictionary databases, the recognition is ended at a moment that recognition results fulfil prescribed conditions, and thus faster character recognition can be performed compared with the situation where recognition is performed using all the dictionary databases of degradation levels.

Moreover, preferably, in the present invention, the usage order determination means pre-stores corresponding relationships between the degradation degrees of the character image and the dictionary databases, and determines the usage order using the corresponding relationships.

Moreover, also preferably, in the present invention, the usage order determination means calculates, according to the corresponding relationships, a degradation level corresponding to the degradation degree of the character image, and determines the usage order as first using the dictionary database corresponding to the calculated degradation level and then beginning to sequentially use dictionary databases corresponding to degradation levels approximate to the calculated degradation level.

Moreover, preferably, the corresponding relationships are generated based on results obtained by comparing a plurality of test images using all the dictionary databases corresponding to the plurality of degradation levels.

According to the structure, according to a degradation degree of a character image of a recognition object, a dictionary database more expecting accurate recognition is determined as an earlier usage order, and thus it can be expected that recognition results fulfil prescribed conditions at an earlier stage, so that high speed of processing can be further implemented.

Moreover, the prescribed conditions may include a condition of setting the highest comparison score in the character recognition using the dictionary databases to be above a prescribed threshold.

Moreover, the prescribed conditions may include a condition of setting a difference between the highest comparison score and the second highest comparison score in the character recognition using the dictionary databases to be above a prescribed threshold.

If such a condition is fulfilled, reliability of the character recognition may be high, and thus output of low-reliability recognition results can be avoided, so that high speed of processing and increase of recognition precision can be balanced.

Moreover, preferably, the degradation degree of the character image is determined based on a difference between a size of the extracted character image by the extraction means and a size after standardization processing. Then, also preferably, in the standardization processing, the character image is transformed into a square with a prescribed size, and the degradation degree of the character image is determined based on a value obtained by subtracting a greater one in a vertical size and a horizontal size of the character image extracted by the extraction means from a length of one side of the square. In character recognition, the size of the extracted character image is standardized and recognized, and if the size of the extracted character image is less than the standardized size, the character image may be degraded due to standardization (enlargement). Therefore, the degree of the character image can be determined based on the size of the character image before standardization.

Moreover, in addition to a situation where the size of the extracted character image is less than the standardized size, the character image may also be degraded due to generation of blur, half-dry stroke of characters, damage of the characters, and noise overlapping. Therefore, the degradation degree of the character image may also be a value obtained by evaluating the quantity of blur, a half-dry stroke degree of the characters, a damage degree of the characters, the quantity of noise overlapping and the like.

Moreover, also preferably, the image includes at least one part of a vehicle, and the extraction means extracts, from the image, characters described on a number plate hung on the vehicle as the character image.

In addition, the present invention can be grasped as a character recognition device including at least one of the means. Moreover, the present invention can also be grasped as a character recognition method. Moreover, the present invention can also be grasped as a computer program for making a computer perform the steps of the methods or a storage medium storing the program non-temporarily and computer-readable. The structure and the processing can be combined with each other in a scope of not being technically contradictory to form the present invention.

Effect of the Invention

According to the present invention, accurate and fast recognition of degraded character images can be performed.

BRIEF DESCRIPTION OF THE DRAWINGS

FIG. 2 is a diagram of making of a degraded dictionary.

FIG. 7 is a diagram of a correspondence table of degradation degrees and degradation levels of dictionaries, and a usage order determination algorithm.

DESCRIPTION OF THE EMBODIMENTS

Exemplary forms for implementing the present invention are exemplarily described below in detail with reference to the accompanying drawings. However, sizes, materials, shapes, relative configuration thereof and the like of components described in the following embodiments are not intended to limit the scope of the present invention merely to the purport of the contents unless specifically described.

First Embodiment

The character recognition device of the embodiment is a device also capable of accurate and fast recognition even if a size of a character in an input image is less than a prescribed standardized size. In a situation where a size of a character image (a literal token) is less than the standardized size, the character image may become a blurry image due to enlargement when it is converted to the standardized size, thus leading to reduction of character recognition precision. The size of the character image in the input image is ideally above the standardized size, and the character image whose size is less than the standardized size may be degraded. In the embodiment, accurate and fast recognition can be performed even if such a degraded character image is generated.

<Structure>

Figure 1A:
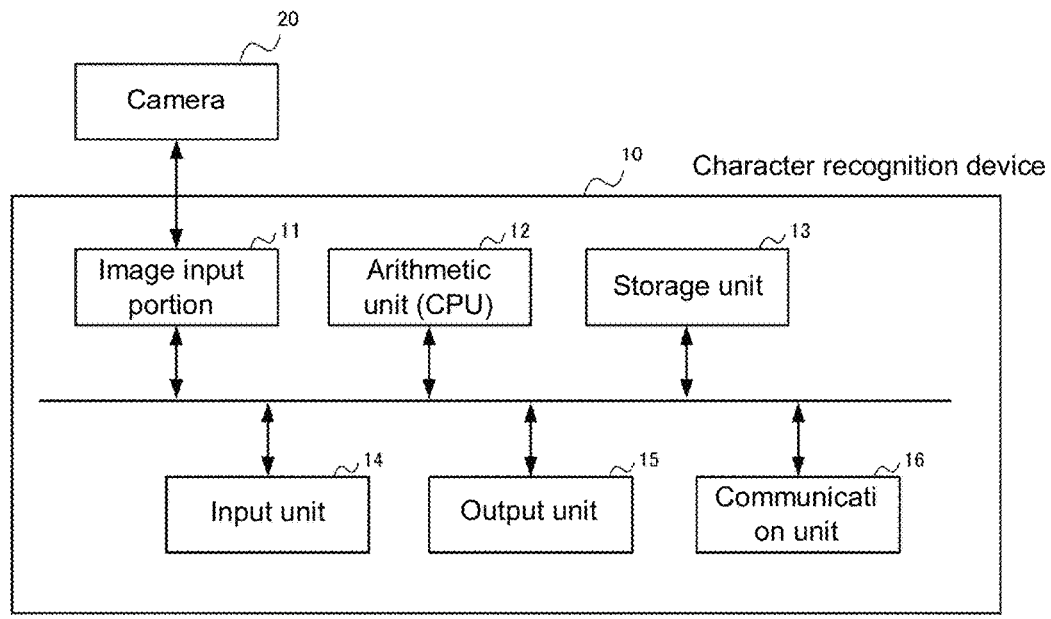
FIGS. 1(a) and 1(b) are block diagrams of a hardware structure and a function structure of a character recognition device according to an embodiment.

FIG. 1(a) is a diagram of a hardware structure of a character recognition device 10 according to the embodiment. The character recognition device 10 includes an image input portion 11, an arithmetic unit 12, a storage unit 13, an input unit 14, an output unit 15, and a communication unit 16. The image input portion 11 is an interface that receives image data from a camera 20. In addition, in the embodiment, image data is directly received from the camera 20, but the image data may also be received via the communication unit 16 or via a recording medium. The arithmetic unit 12 is a general-purpose processor such as a Central Processing Unit (CPU), which executes a program stored in the storage unit 13, to achieve the following processing. The storage unit 13 includes a main storage unit and an auxiliary storage unit, stores the program executed by the arithmetic unit 12, and stores temporary data in the image data or the execution of the program. The input unit 14 is a unit that includes a keyboard or a mouse and allows a user to input an indication for the character recognition device. The output unit 15 is a unit that includes a display unit or a speaker and allows the character recognition device to output to the user. The communication unit 16 is a unit that allows the character recognition device 10 to communicate with an external computer. The communication form may be wired or wireless, and the communication specification may be arbitrary.

Figure 1B:
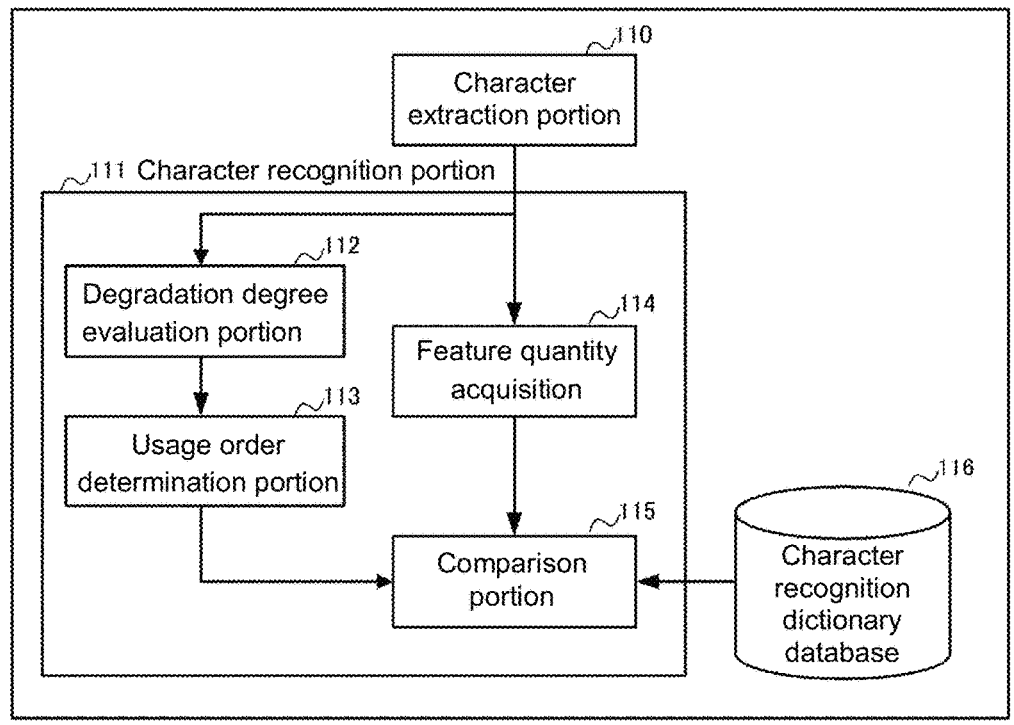

The arithmetic unit 12 implements the functions shown in FIG. 1(*b*) by executing the program. That is, the arithmetic unit 12 implements the functions of a character extraction portion 110, a character recognition portion 111, and a character recognition dictionary database 116. The character recognition portion 111 includes a degradation degree evaluation portion 112, a usage order determination portion 113, a feature quantity acquisition portion 114 and a comparison portion 115. Processing contents of the portions are described below.

<Dictionary Making>

In the character recognition dictionary database 116, a plurality of dictionaries (character recognition database) of degradation levels are stored. As shown in FIG. 2, various dictionaries of degradation levels are generated from images wherein a sharp character image (original character image) has been degraded using degradation levels. For example, the original character image is a sharp image with 65×65 pixels. In the figure, only one image is illustrated for one character. However, in fact, for one character, a plurality of images are used for dictionary making.

Figure 3:
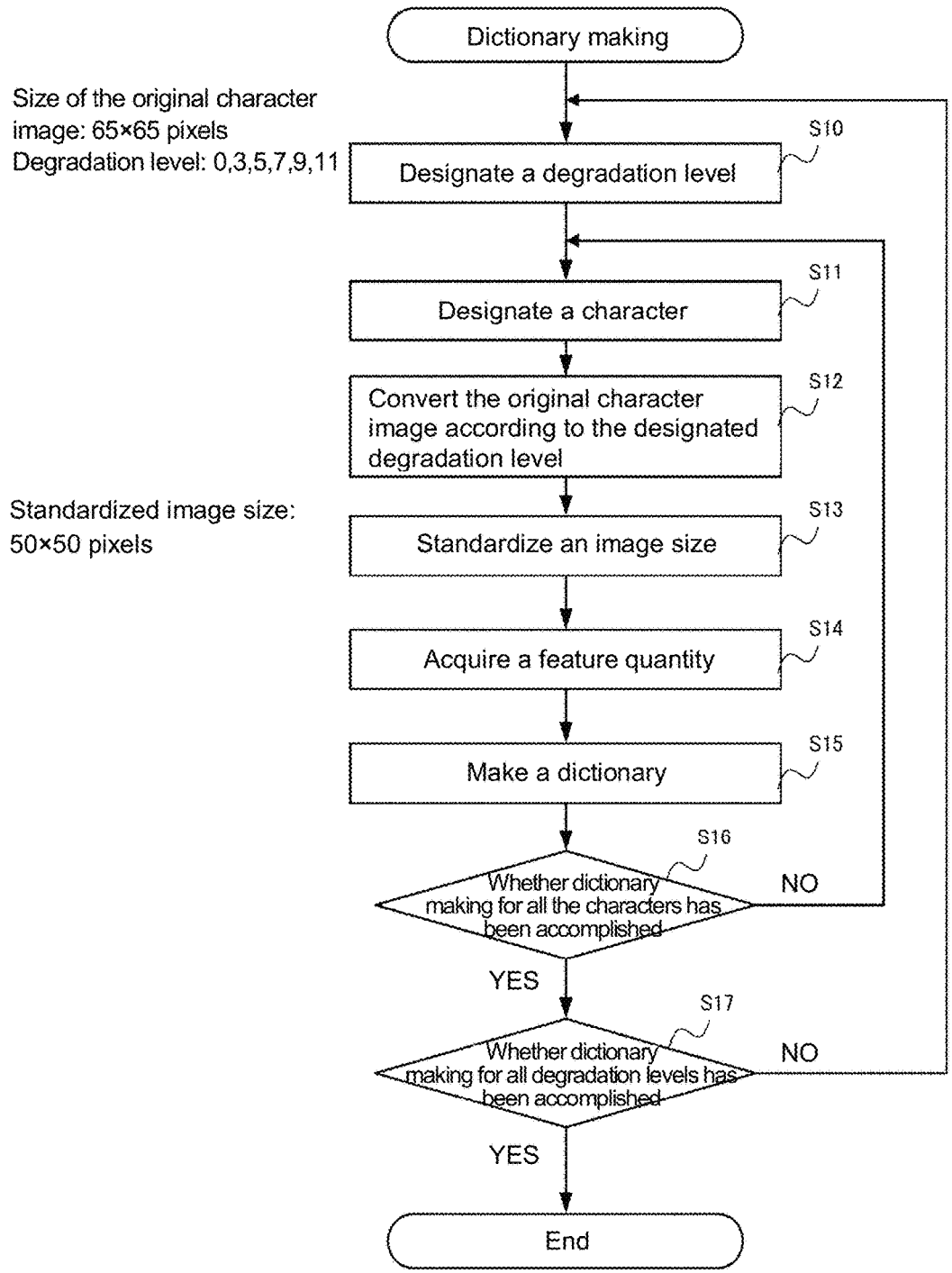
FIG. 3 is a flow chart of a making process of the degraded dictionary.

Dictionary making is described in the following with reference to the flow chart of FIG. 3. In addition, the dictionary making not only can be performed by the character recognition device 10 but also can be performed by other devices, and the made dictionary data is stored in the character recognition dictionary database 116.

In the dictionary making, at first, degradation levels of a dictionary to be made are designated (S10). Herein, suppose that a dictionary of degradation levels 0, 3, 5, 7, 9 and 11 is made. A designated order of the degradation levels in step S10 may be arbitrary. Next, object characters of the dictionary to be made are designated (S11). A designated order of characters may be arbitrary.

In step S12, conversion of degrading the original character image of the character designated (hereinafter referred to as degradation) is implemented according to the designated degradation level (if the designated degradation level is 0, no operation is performed). As stated above, for the designated character, there are a plurality of original character images, and thus all the images are converted. In the embodiment, blurring (blur adding) of replacing pixel values with a mean value of pixel values of surrounding pixels (simple averaging or weighted averaging) is used as conversion. The degradation level corresponds to blur intensity in the blurring. In addition, other conversions may also be employed as long as blurring can be added to the image. For example, it is also possible to reduce the image to the size corresponding to the degradation level and then implement enlargement of restoring the image to the original size.

In step S13, various character images that have been degraded are converted to a prescribed standardized size. In the embodiment, the character image is converted to a square of 50×50 pixels through the standardization. In the embodiment, the size of the original image is greater than the standardized size, but the size of the original image may also be the same as the standardized size. Conversion of the character size may be performed through bilinear interpolation, bicubic interpolation, nearest neighbor interpolation or any other known algorithms. In a situation where the character image is not a square but a rectangle with different vertical and horizontal lengths, it is also possible to, in a state of maintaining an aspect ratio, perform enlargement or reduction in a manner of making a greater one in the vertical and horizontal lengths become a standardized size, and configure the results in the center of the image. At this point, for a brightness value of pixels in the margin, it is also possible to calculate, according to the character image of the conversion results, a mean value of brightness values of peripheral pixels for setting.

In step S14, a character feature quantity (feature quantity vector) indicating a character feature is acquired from various character images after degradation and standardization. As methods of acquiring character features, a pixel feature extraction method, a contour feature extraction method, a gradient feature extraction method and the like are widely used, but any character feature extraction method may also be used. For example, a direction of a contour line may also be indicated with a chain code for each pixel, a histogram of chain codes in various small regions is used as a character feature quantity, and the summation of pixel values of each small region may also be used as a character feature quantity.

In step S15, dictionary data for identifying designated characters is made by using a plurality of character feature quantities acquired through step S14. The dictionary is used to calculate similarity between (character feature quantities) of input characters and (character feature quantities) of characters regarded as objects by the dictionary. In the present application, a dictionary made using character feature quantities acquired from degraded character images is referred to as a degraded dictionary. As a character recognition method, a local space method, a neural network, a Support Vector Machine (SVM), discriminant analysis or other known methods can be used, as long as the dictionary is made with a well-known method according to the manner.

So far, through the processing, making of the dictionary of the characters designated in step S1 in the degradation level designated in step S10 is accomplished. In step S16, whether dictionary making for all the characters in the degradation levels has been accomplished, if no, go back to step S11 to make a dictionary for characters not processed. If the dictionary making for all the characters in the degradation levels designated has been accomplished, proceed to step S17 to judge whether dictionary making for all the degradation levels has been accomplished. If no, go back to step S10 to make a dictionary for degradation levels not processed. If the dictionary making for all the degradation levels has been accomplished, the dictionary making ends.

<Character Recognition>

Figure 4:
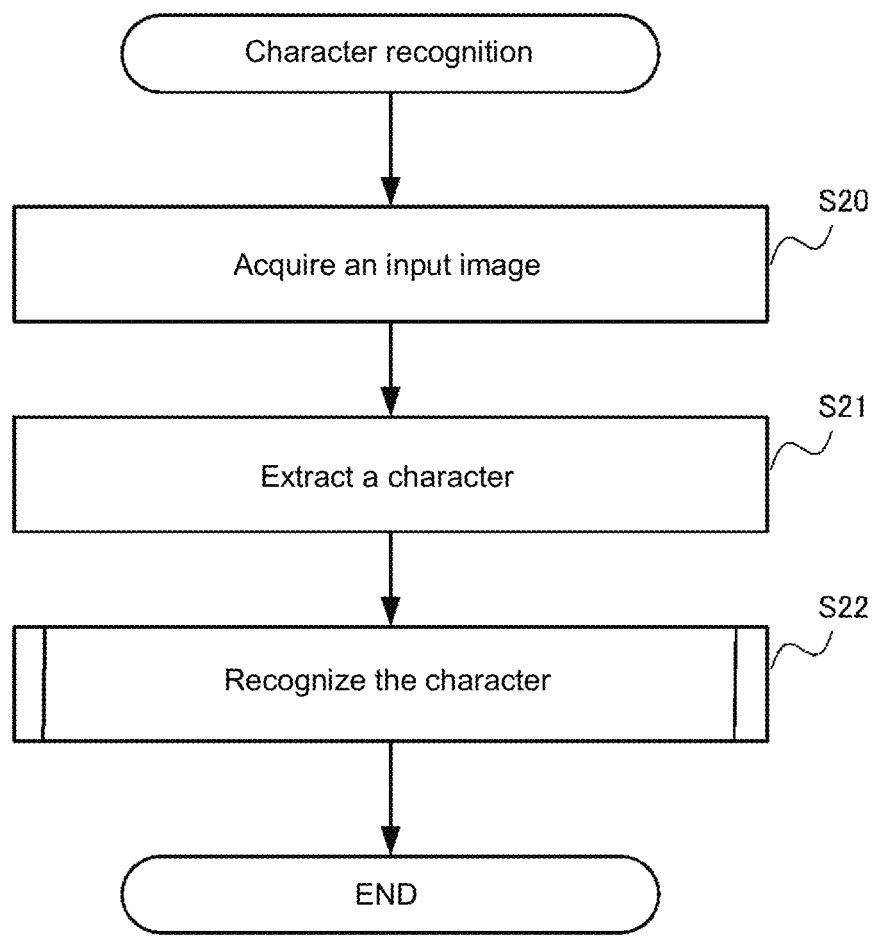
FIG. 4 is a flow chart of a whole process of character recognition.

FIG. 4 is a flow chart of a whole process of character recognition performed by the character recognition device 10. In step S20, the character recognition device 10 acquires, from the camera 20, image data of shot characters via the image input portion 11. In step S21, the character extraction portion 110 extracts a character string from a received image, and further extracts therefrom character images of characters one by one. In character extraction, preferably, linear conversion is implemented to modify inclination of characters, so as to extract a rectangular character region without inclination. In step S22, the character recognition portion 111 compares characters dug out with characters in a dictionary of the character recognition dictionary database 116, and recognizes characters included in a character image dug out.

Figure 5:
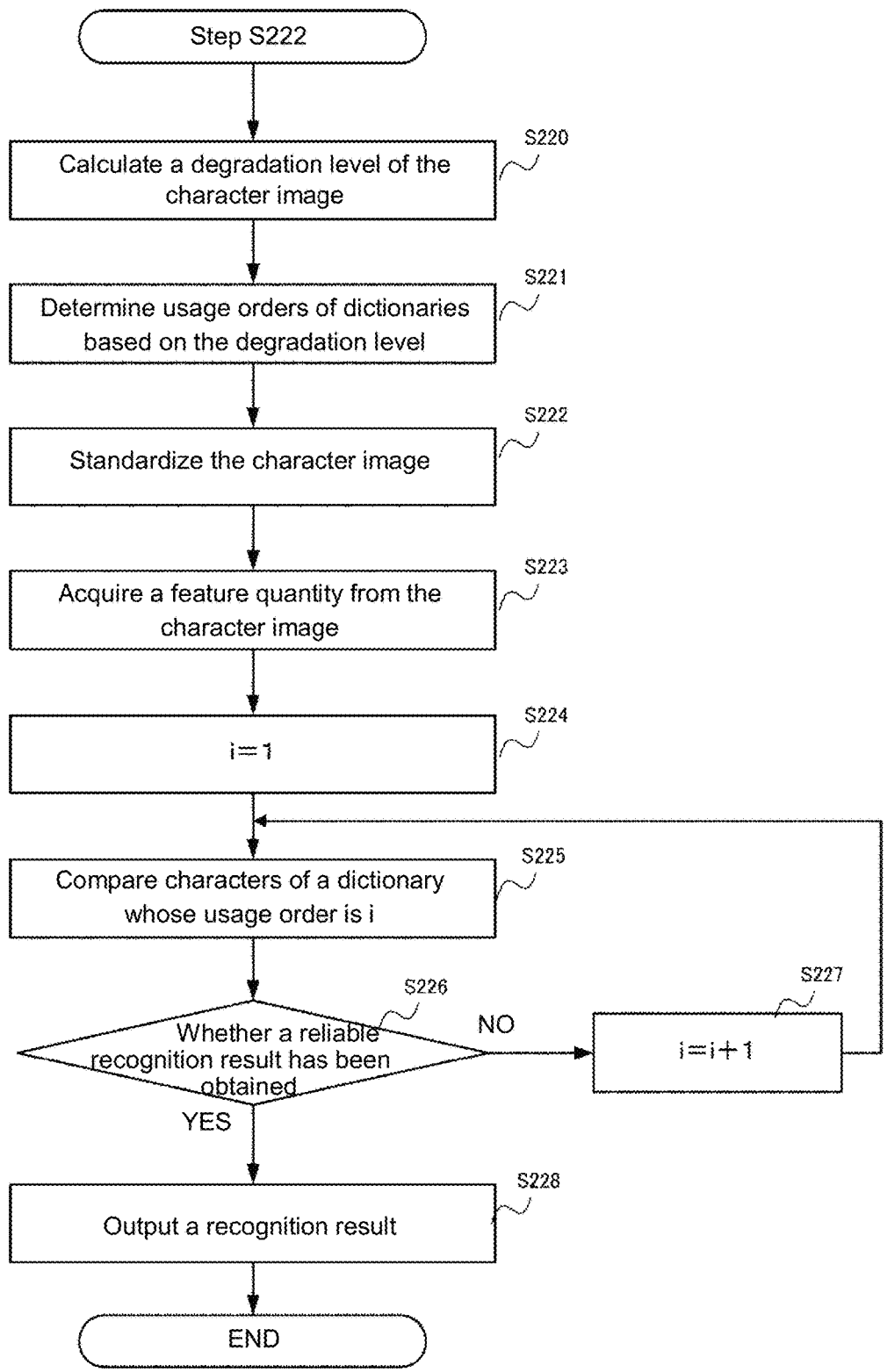
FIG. 5 is a flow chart of a detailed process of character recognition for an extracted character.

Details of the character recognition in step S22 are described with reference to the flow chart of FIG. 5. The processing of the flow chart shown in FIG. 5 is processing the character images extracted in step S21 respectively. Moreover, in the description herein, the so-called character image refers to a regional image extracted as one character.

Figure 6:
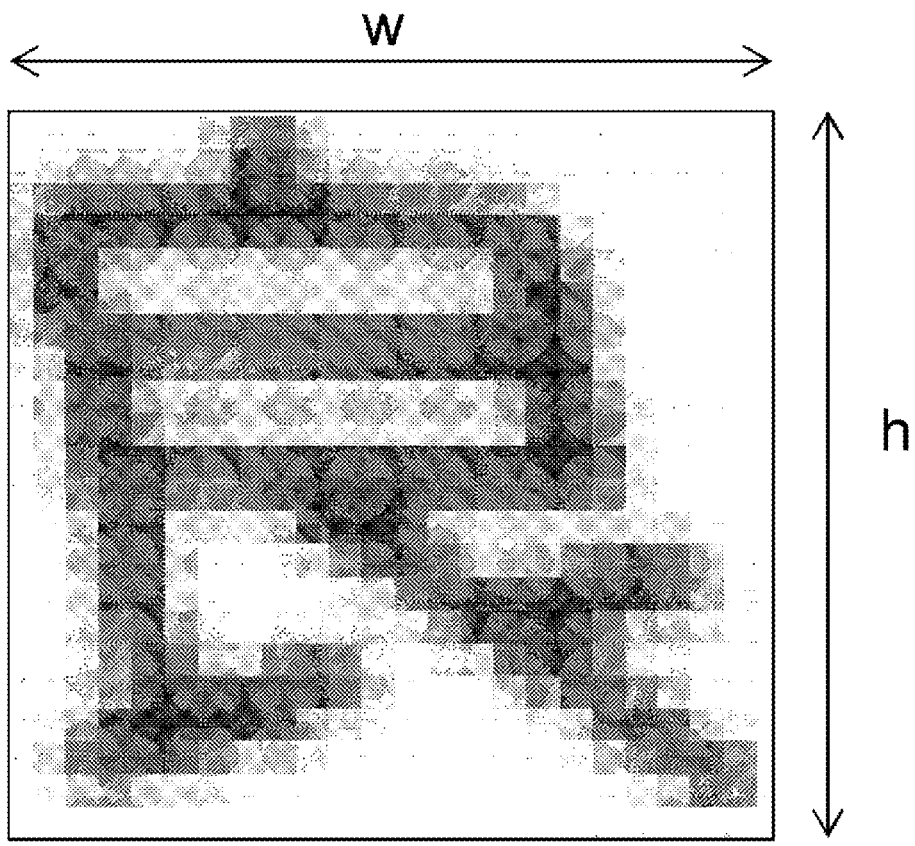
FIG. 6 is a diagram of a degradation degree of a character image.

In step S220, the degradation degree evaluation portion 112 calculates a degradation degree according to a character image. For the degradation degree of the character image, the greater the value is, the greater the degradation is. An example of a method for calculating a degradation degree is described with reference to FIG. 6. FIG. 6 is a diagram of a character image extracted in step S21. It is set that the character image is rectangular, its horizontal size (pixel number) is w, and its vertical size (pixel number) is h. In addition, suppose that modification of character inclination has been implemented in the processing so far. However, suppose that conversion (enlargement and reduction) on the size of the mage is not implemented, and the sizes w and h are the same as those on the input image. In the embodiment, the degradation degree r is determined as follows.

$$r = R_0 - \max(w, h)$$

Herein, $R_0$ is a length (pixel number) of one side of a standardized image of a square, which is 50 pixels in the embodiment. Moreover, max denotes a maximum function. In addition, when max(w, h) is greater than $R_0$, the degradation degree r is zero.

The degradation degree in the embodiment may be a parameter for evaluating a difference between the size of the character image and the standardized size after comparison. In addition, as long as such evaluation can be made, the degradation degree may also be determined through methods other than the method. For example, a difference between any of the horizontal size and the vertical size and a length of one side of the standardized image size may be set as the degradation degree no matter how the relationship between their sizes is. Alternatively, a value obtained by subtracting an area of the character image from an area of the standardized image may also be set as the degradation degree. However, when the degradation degree is determined through a greater one in the vertical size and the horizontal size, even if it is a vertical or horizontal character image like the number "1", an alphabet "l" or a Chinese number "—", the degradation degree can be calculated properly.

In step S221, the usage order determination portion 113 determines usage orders (preferential sequences) of dictionaries based on the degradation degree of the character image. The usage order determination portion 113 pre-stores corresponding relationships between the degradation degrees of the character images and the degradation levels of the dictionaries which are as shown by FIG. 7 and indicate which degradation level should be used according to the degradation degree of the character image. The usage order determination portion 113 calculates, from the corresponding relationship, a degradation level corresponding to the degradation degree calculated in step S220, and determines a dictionary of the calculated degradation level as a dictionary to be used at first. Moreover, the usage orders of the dictionaries are determined by beginning to sequentially use dictionaries of degradation levels approximate to the degradation level corresponding to the calculated degradation degree. Differences between the degradation levels are defined through an appropriate measure. In this embodiment, differences of the degradation levels (values) are taken as the differences between the degradation levels. Herein, if there are a plurality of dictionaries having degradation levels with the same similarity as the degradation levels corresponding to the degradation degrees, which one is used at first is ok, but in the embodiment, dictionaries with low degradation levels are used at first.

In addition, in character recognition, it is not necessary to use the dictionaries of all the degradation levels. Therefore, the determined usage order may not include all the degradation levels. For example, a dictionary a difference between whose degradation degree and the degradation level calculated according to the degradation level of the character image is above a prescribed value may not be used for character recognition. This is because the possibility that accurate recognition is impossible is high if the difference of the degradation levels is great.

A method for making a corresponding relationship between the degradation degree and the degradation level shown in FIG. 7 is described simply. The corresponding relationship, for example, may be made by comparing used test samples (test images) in advance. Specifically, test samples with various degradation degrees (image sizes) and dictionaries of all degradation degrees may be compared one by one, to calculate the corresponding relationship between the degradation degree and the degradation level based on accuracy of the comparison result. That is, a degradation level of a dictionary that can recognize a test sample with a certain degradation degree most accurately on the whole may be determined as the degradation level corresponding to the degradation degree. Moreover, the corresponding relationship may also be determined theoretically. For example, the corresponding relationship between the degradation degree and the degradation level may also be calculated according to at what degree the original character image is blurred when the degraded dictionary is made.

In step S223, the feature quantity acquisition portion 114 acquires a character feature quantity from the character image. Acquisition of the character feature quantity is the same as the processing during dictionary making, and thus repeated description is omitted. In addition, preferably, before extraction of the character feature quantity, size, position, roughness, inclination and the like are standardized, to eliminate changes of the characters as much as possible. Especially, during standardization of the size of the character image, the size is converted to be the same as the standardized size (which is 50×50 pixels in the embodiment) during dictionary making.

In the processing of step S225 to step S228, the comparison portion 115 compares a dictionary with a character according to the usage order determined in step S221, and outputs recognition results. At first, in step S224, 1 is substituted into a variable i. In step S225, a dictionary whose usage order is i is used to compare an input character with characters in the dictionary. As a result of the comparison, similarity (comparison score) between the characters in the dictionary whose usage order is I and the input character is obtained. A recognition result that the character with the highest comparison score is the input character is obtained. In step S226, the comparison portion 115 judges whether the obtained recognition result is reliable. Specifically, it is judged whether the comparison score obtained in step S225 fulfils a prescribed condition. As the prescribed condition, for example, a condition of making the highest comparison score above a prescribed threshold or a condition of making a difference between the highest comparison score and the second highest comparison score above a prescribed threshold may be employed. When it is judged that the recognition result using the ith dictionary fulfils the condition to be a reliable result, proceed to step S228, in which the comparison portion 115 outputs the character with the highest comparison score as a recognition result of the input character. On the other hand, if the condition is not fulfilled, proceed to step S227, to perform increment on the variable i and perform comparison using the dictionary next in usage order. In addition, when a reliable result is still not obtained even if the dictionaries of all the degradation levels have been used, not only can an error indicating that character recognition cannot be performed be returned, but also the recognition result of the input character can be determined based on the result of the comparison hereto.

Figure 8:
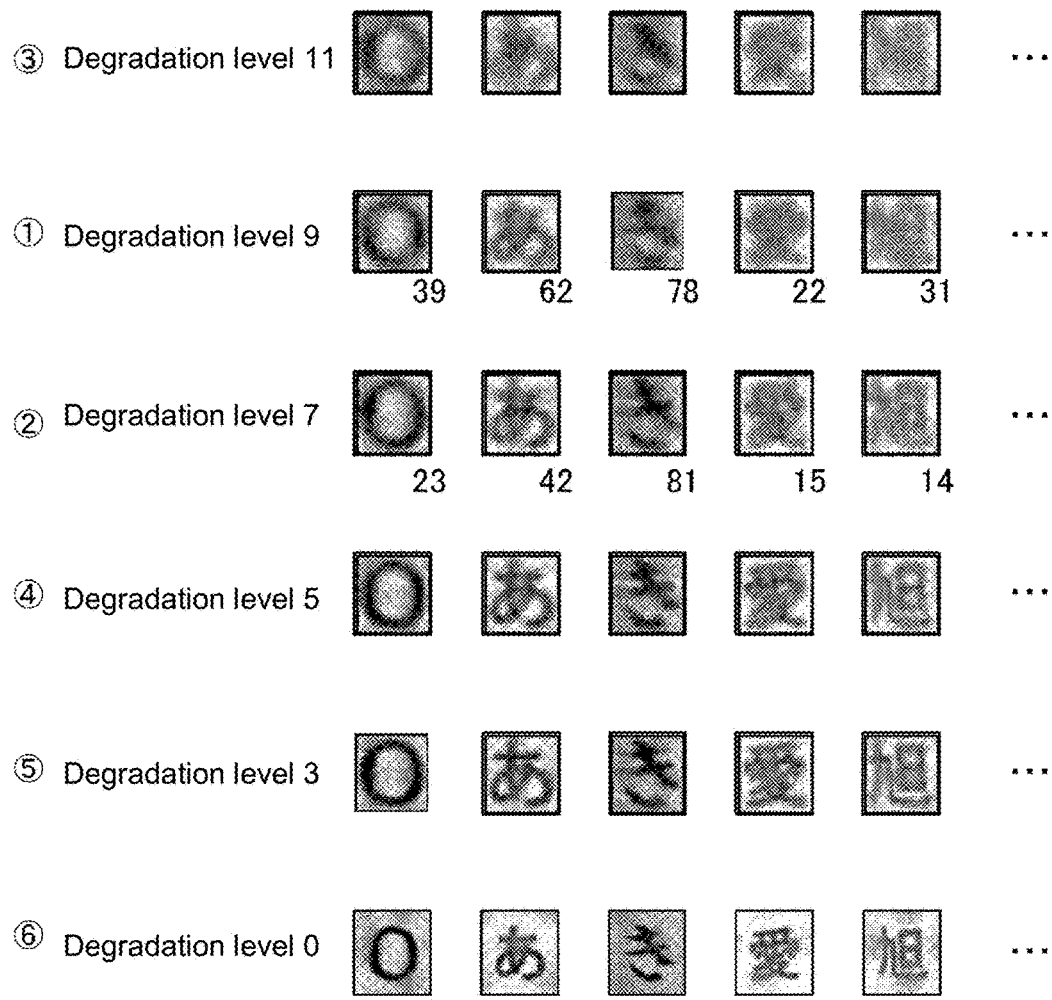
FIG. 8 is a diagram of reliability judgment of recognition results in character recognition.

An operating example of the character comparison is described with reference to FIG. 8. Herein, suppose that the degradation degree r of the character image is 33, therefore, the usage order of the degraded dictionaries is an order of the degradation levels 9, 7, 11, 5, 3. Firstly, a dictionary whose usage order is a degradation level of 1 is used to compare the characters. The number shown below the degraded character image in the figure indicates a comparison score (the full score is 100) of the input character. Herein, a condition of judging that the comparison result is reliable is set as a condition of making the highest comparison score above 80. Then, as the highest comparison score in the comparison with the dictionary whose degradation level is 9 is 78, it is judged that reliable recognition cannot be performed. Then, a dictionary of a degradation level of 7 whose usage order is 2 is used for comparison. At this point, the highest comparison score is 81, which fulfils the condition. Therefore, the obtained character "冬" with the highest comparison score is output as the recognition result.

<Favourable Effects>

According to the embodiment, in the character recognition of the dictionary using a plurality of degradation levels, a character recognition result can be obtained without taking the dictionaries of all the degradation levels in turns, which, as compared with the method of taking turns for implementation, can thus achieve high speed of processing. At this point, as a condition for obtaining a final character recognition result, a judgment that ensures a reliable comparison result is made, and precision of the recognition can also be ensured. Then, as the order of the dictionary to be used is determined according to the degradation degree of the input character image, it is unnecessary to compare the dictionaries using a plurality of degradation levels in order to obtain a reliable result, and a reliable result can be obtained as long as one to more dictionaries are compared.

In addition, in the description, the description focuses on processing when the character image is degraded, but the character recognition device of the embodiment can perform accurate and fast recognition of character images not degraded. If the character image is not degraded, the dictionary whose degradation level is 0 is determined as the one to be used first. As it can be expected that a recognition result of using the dictionary is reliable, an accurate recognition result can be obtained through comparison with one dictionary.

Other Embodiments

The description about the embodiment merely exemplarily describes the present invention, and the present invention is not limited to the specific form. Various transformations can be made to the present invention within the scope of the technical thought.

In the description about the embodiment, the reason why the input character image is degraded from an ideal state is described by taking that the size of the input character image is small as an example, but the degradation of the input character image may also be generated due to other reasons. For example, the input character image may also be degraded due to blur, half-dry stroke of characters, damage to the characters, noise overlapping and the like. Even if the degradations are generated, accurate and fast character recognition can also be performed by means of the method similar to the embodiment. By taking the half-dry stroke of characters as an example, as long as half-dry stroke adding with a plurality of intensities (degradation levels) is implemented on the original character image, degraded dictionaries are made respectively, a half-dry stroke degree (degradation degree) of the input character image is evaluated, and a comparison order of the dictionaries is determined according to a usage order corresponding to a blurring degree. By taking noise overlapping as an example, as long as Gaussian noise is added to the original character image, degraded images are made respectively, noise quantity of the input character image is evaluated, and a comparison order of the dictionaries is determined according to a usage order corresponding to the noise quantity. The noise quantity, for example, may be calculated in the following manner, and the manner is as disclosed in International Publication WO2012/173205, in which standard deviations calculated from a plurality of local regions of the input character image are made into a histogram, and a value of a standard deviation when a frequency reaches a peak is calculated.

Moreover, even if the degradation caused by multiple reasons is generated, precise and accurate recognition can also be performed. For example, description is given by taking two degradations in the case of a small character size and half-dry stroke of characters as an example. Firstly, two kinds of degradation processing, i.e., blur adding and half-dry stroke adding, are implemented on the original character image to make a degraded dictionary. At this point, multiple combinations of blur adding intensities and half-dry stroke adding intensities are made to implement the degradation processing, so as to make the degraded dictionary respectively. Then, it is feasible only if the degraded dictionary is used according to a usage order determined based on the size and the half-dry stroke degree of the input character image.

In the description, an example of providing functions by executing a software program through a general-purpose processor is described, but a dedicated hardware circuit may also be used to provide the functions.

The character recognition device of the embodiment can be installed to any device such as a desktop computer, a note computer, a slate computer, or a smart phone terminal. Moreover, the functions of the character recognition device in the description do not need to be performed by one device, which may also be performed by a plurality of devices by taking over their respective functions.

The character recognition device of the present invention is applicable to a number plate recognition system. The number plate recognition system, for example, includes a camera (a camera device) arranged on a lamp-post erected on a road side and the character recognition device in the description, the camera shoots at least one part of a vehicle on the road, and the character recognition device extracts, from a shot image, and recognizes characters described on a number plate hung on the vehicle. According to the number plate recognition system, even if the vehicle is in a position away from the camera and only a small character image can be obtained, the characters described on the number plate mounted to the vehicle can still be accurately and fast recognized.

DESCRIPTION ABOUT SYMBOLS

10: character recognition device
110: character extraction portion
111: character recognition portion
112: degradation degree evaluation portion
113: usage order determination portion
114: feature quantity acquisition portion
115: comparison portion
116: character recognition dictionary database

What is claimed is:

1. A character recognition device, comprising:
a memory, configured to store a plurality of dictionary databases corresponding to each of a plurality of degradation levels, said plurality of dictionary databases being generated from images wherein an original character image has been degraded using a plurality of different degradation levels;
a data transmission interface, configured to receive input of images; and
a processor, configured to:
extract character images from said images;
determine an usage order for the plurality of dictionary databases on the basis of degradation degrees for extracted character images comprising:
calculate, according to corresponding relationships between the degradation degrees of the character images and the dictionary databases, a degradation level corresponding to the degradation degree of the character images; and
determine the usage order as first using the dictionary database corresponding to the calculated degradation level and then beginning to sequentially use dictionary databases corresponding to degradation levels approximate to the calculated degradation level; and
use dictionary databases in accordance with said usage order, recognize characters included in the extracted character images and, if recognition results do not fulfil prescribed conditions, perform character recognition using the dictionary database next in said usage order, if recognition results fulfil the prescribed conditions, output the recognition results without performing recognition using the dictionary database next in said usage order.

2. The character recognition device according to claim 1, wherein
the corresponding relationships are generated based on results obtained by comparing a plurality of test images using all the dictionary databases corresponding to the plurality of degradation levels.

3. The character recognition device according to claim 1, wherein
the prescribed conditions comprise a condition of setting the highest comparison score in the character recognition using the dictionary databases to be above a prescribed threshold.

4. The character recognition device according to claim 1, wherein
the prescribed conditions comprise a condition of setting a difference between the highest comparison score and the second highest comparison score in the character recognition using the dictionary databases to be above a prescribed threshold.

5. The character recognition device according to claim 1, wherein
the degradation degree of the character image is determined based on a difference between a size of the extracted character image by the processor and a size after standardization processing.

6. The character recognition device according to claim 5, wherein
in the standardization processing, the character image is transformed into a square with a prescribed size, and
the degradation degree of the character image is determined based on a value obtained by subtracting a greater one in a vertical size and a horizontal size of the character image extracted by the processor from a length of one side of the square.

7. The character recognition device according to claim 1, wherein
the image comprises at least one part of a vehicle, and
the processor extracts, from the image, characters described on a number plate hung on the vehicle as the character image.

8. A character recognition method, executed by a computer, the computer storing a plurality of dictionary databases corresponding to each of a plurality of degradation levels, said plurality of dictionary databases being generated from images wherein an original character image has been degraded using a plurality of different degradation levels, the character recognition method comprising:
an image input step of receiving input of images;
an extraction step of extracting character image from said images;
a usage order determination step of determining an usage order for the plurality of dictionary databases on the basis of degradation degrees for extracted character images, wherein the usage order determination step comprises:
calculating, according to corresponding relationships between the degradation degrees of the character images and the dictionary databases, a degradation level corresponding to the degradation degree of the character images; and
determining the usage order as first using the dictionary database corresponding to the calculated degradation level and then beginning to sequentially use dictionary databases corresponding to degradation levels approximate to the calculated degradation level; and
a character recognition step of using dictionary databases in accordance with said usage order, recognizes characters included in the extracted character image and, if recognition results do not fulfil prescribed conditions, performing character recognition using the dictionary database next in said usage order, if recognition results fulfil the prescribed conditions, outputting the recognition results without performing recognition using the dictionary database next in said usage order.

9. A non-transitory computer-readable recording medium, storing a program causing a computer to perform the steps of:
receiving input of images;
extracting character image from said images;

determining an usage order for the plurality of dictionary databases on the basis of degradation degrees for extracted character images, comprising:
calculating, according to corresponding relationships between the degradation degrees of the character images and the dictionary databases, a degradation level corresponding to the degradation degree of the character images; and
determining the usage order as first using the dictionary database corresponding to the calculated degradation level and then beginning to sequentially use dictionary databases corresponding to degradation levels approximate to the calculated degradation level; and
using dictionary databases in accordance with said usage order, recognizes characters included in the extracted character image and, if recognition results do not fulfil prescribed conditions, performing character recognition using the dictionary database next in said usage order, if recognition results fulfil the prescribed conditions, outputting the recognition results without performing recognition using the dictionary database next in said usage order.

* * * * *